United States Patent Office.

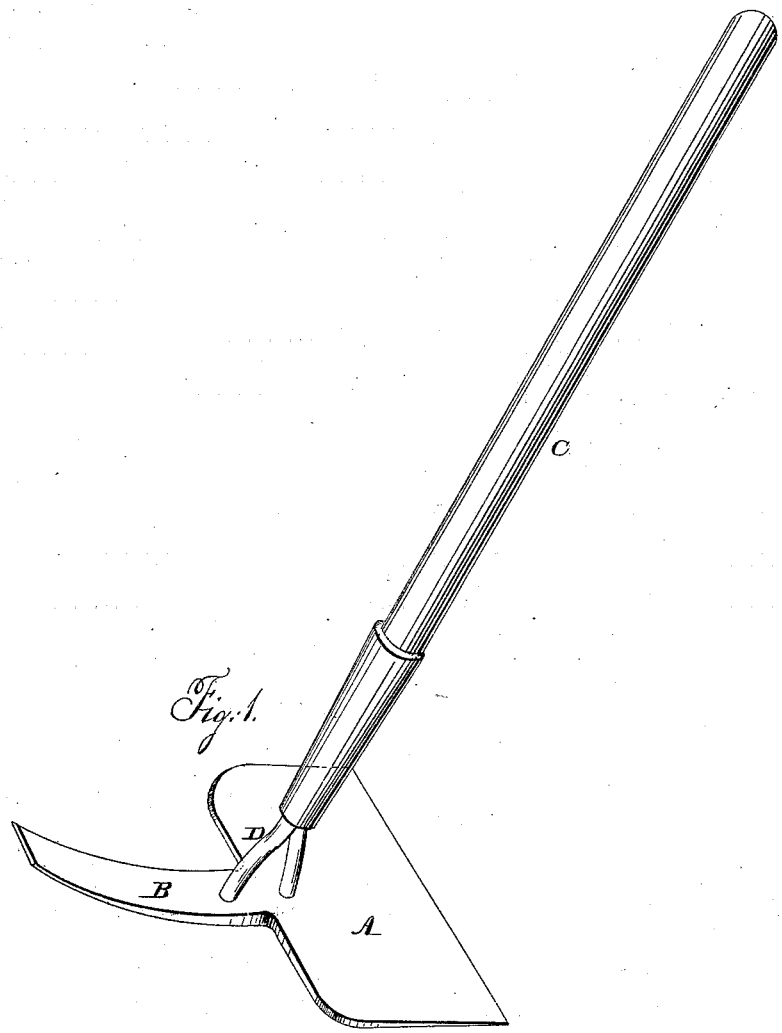

JOSIAH DODGE, OF GRASS VALLEY, CALIFORNIA.

*Letters Patent No. 78,724, dated June 9, 1868.*

IMPROVEMENT IN HOES.

The Schedule referred to in these Letters Patent and making part of the same.

TO ALL WHOM IT MAY CONCERN:

Be it known that I, JOSIAH DODGE, of Grass Valley, in the county of Nevada, and State of California, have invented a new and useful Improvement in Hoes; and I do hereby declare that the following is a full, clear, and exact description thereof, which will enable those skilled in the art to make and use the same, reference being had to the accompanying drawings forming part of this specification.

The object of this invention is to furnish a hoe which shall be adapted to many purposes to which the common hoe cannot be applied, and also to so construct the hoe that it shall be much more durable than the common hoe; and the invention consists in making the hoe with a horn or pick attached to the blade, and with a forked shank, thereby adapting it to various new and useful purposes, and rendering it much more strong and durable than the ordinary hoe.

The drawing represents a perspective view of a hoe made according to my invention.

A is the blade of the hoe; B is the pick, attached to the blade by welding or otherwise; C is the handle; and D is the forked shank.

One fork of the shank is secured in the pick B, and the other shank is secured to the blade of the hoe, and they are so placed that they brace each other, while they give support to the hoe-blade and the pick.

The shank of the hoe is secured in the handle by a ferrule in the ordinary manner.

For deep cultivation, as well as for working where the plough cannot break the ground conveniently, (as in corners and around plants,) the pick is found extremely valuable, while the forked shank by which the handle is secured to the hoe insures its strength and durability.

Having thus described my invention, I claim as new, and desire to secure by Letters Patent—

In combination with a hoe, the pick B and the forked shank D, substantially as and for the purposes herein shown and described.

JOSIAH DODGE.

Witnesses:
E. W. MASLIN,
M. KIRKPATRICK.